US011591023B2

(12) United States Patent
Park et al.

(10) Patent No.: US 11,591,023 B2
(45) Date of Patent: Feb. 28, 2023

(54) DRIVE UNIT WITH INTERFACE TO MOUNT AND IDENTIFY MULTIPLE DIFFERENT PAYLOAD STRUCTURES

(71) Applicant: Amazon Technologies, Inc., Seattle, WA (US)

(72) Inventors: Christopher Park, Medford, MA (US); Craig Ropi, Medford, MA (US); Gabriel Hebert, Wakefield, MA (US); Eric Jones, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 540 days.

(21) Appl. No.: 16/450,789

(22) Filed: Jun. 24, 2019

(65) Prior Publication Data
US 2020/0377153 A1 Dec. 3, 2020

Related U.S. Application Data

(60) Provisional application No. 62/855,539, filed on May 31, 2019.

(51) Int. Cl.
*B62D 21/09* (2006.01)
*B60G 21/04* (2006.01)
(Continued)

(52) U.S. Cl.
CPC ............ *B62D 21/09* (2013.01); *B60G 21/04* (2013.01); *B60P 3/1033* (2013.01); *B62D 21/18* (2013.01);
(Continued)

(58) Field of Classification Search
CPC ......... G05D 2201/0216; G05D 1/0066; G05D 1/0088; G05D 1/0223; B65D 19/00;
(Continued)

(56) References Cited

U.S. PATENT DOCUMENTS 3,709,313 A * 1/1973 James ................... A63H 11/10
180/21
2017/0291315 A1* 10/2017 Wise ..................... B25J 9/1674
(Continued)

OTHER PUBLICATIONS

PCT Notification of Transmittal of the International Search Report and the Written Opinion of the International Searching Authority for PCT Application No. PCT/US2020/034294, dated Oct. 1, 2020, 12 pages.

*Primary Examiner* — Anne Marie Antonucci
*Assistant Examiner* — Connor L Knight
(74) *Attorney, Agent, or Firm* — Lowenstein Sandler LLP

(57) ABSTRACT

A drive unit of a robotic vehicle including a top surface having a mounting interface to interchangeably couple with multiple different modular payload structures configured to transport items in a facility, workspace or inventory management environment. The mounting interface is configured to securely engage with a mounting portion of the variety of different payload structures to enable a versatile exchange of the payload structure for different conveyance applications. The drive unit includes an electrical interface to communicatively couple with the modular payload structures. The drive unit is configured to use data communicated via the electrical coupling and interface to identify a type of modular payload structure that is mechanically coupled to the mounting interface and implement a motion profile (e.g., speed and acceleration parameters) associated with the identified modular payload structure.

17 Claims, 13 Drawing Sheets

(51) Int. Cl.
*B60P 3/10* (2006.01)
*B62D 21/18* (2006.01)
*G05D 1/00* (2006.01)
*G05D 1/02* (2020.01)

(52) U.S. Cl.
CPC ......... *G05D 1/0066* (2013.01); *G05D 1/0088* (2013.01); *G05D 1/0223* (2013.01); *B60G 2300/45* (2013.01); *G05D 2201/0216* (2013.01)

(58) Field of Classification Search
CPC ...... B66F 9/063; B66F 9/075; B66F 9/07513; B66F 9/06; B66F 9/0755; B66F 9/24; B62D 21/09; B62D 21/18; B62D 61/04; B62D 63/025; B60G 21/04; B60G 2300/45; B60P 3/1033
See application file for complete search history.

(56) References Cited

U.S. PATENT DOCUMENTS

| | | | |
|---|---|---|---|
| 2017/0305570 A1* | 10/2017 | Heinonen | G05D 1/0808 |
| 2017/0364073 A1* | 12/2017 | Guy | B25J 5/005 |
| 2018/0072212 A1* | 3/2018 | Alfaro | G05D 1/0278 |
| 2018/0305126 A1 | 10/2018 | Moulin et al. | |
| 2019/0233028 A1* | 8/2019 | Tengvert | B62D 33/02 |
| 2019/0263463 A1* | 8/2019 | Moulin | B62D 37/00 |
| 2020/0073402 A1* | 3/2020 | Brucker | G05D 1/0278 |
| 2020/0369501 A1* | 11/2020 | Zou | B66F 9/07504 |

* cited by examiner

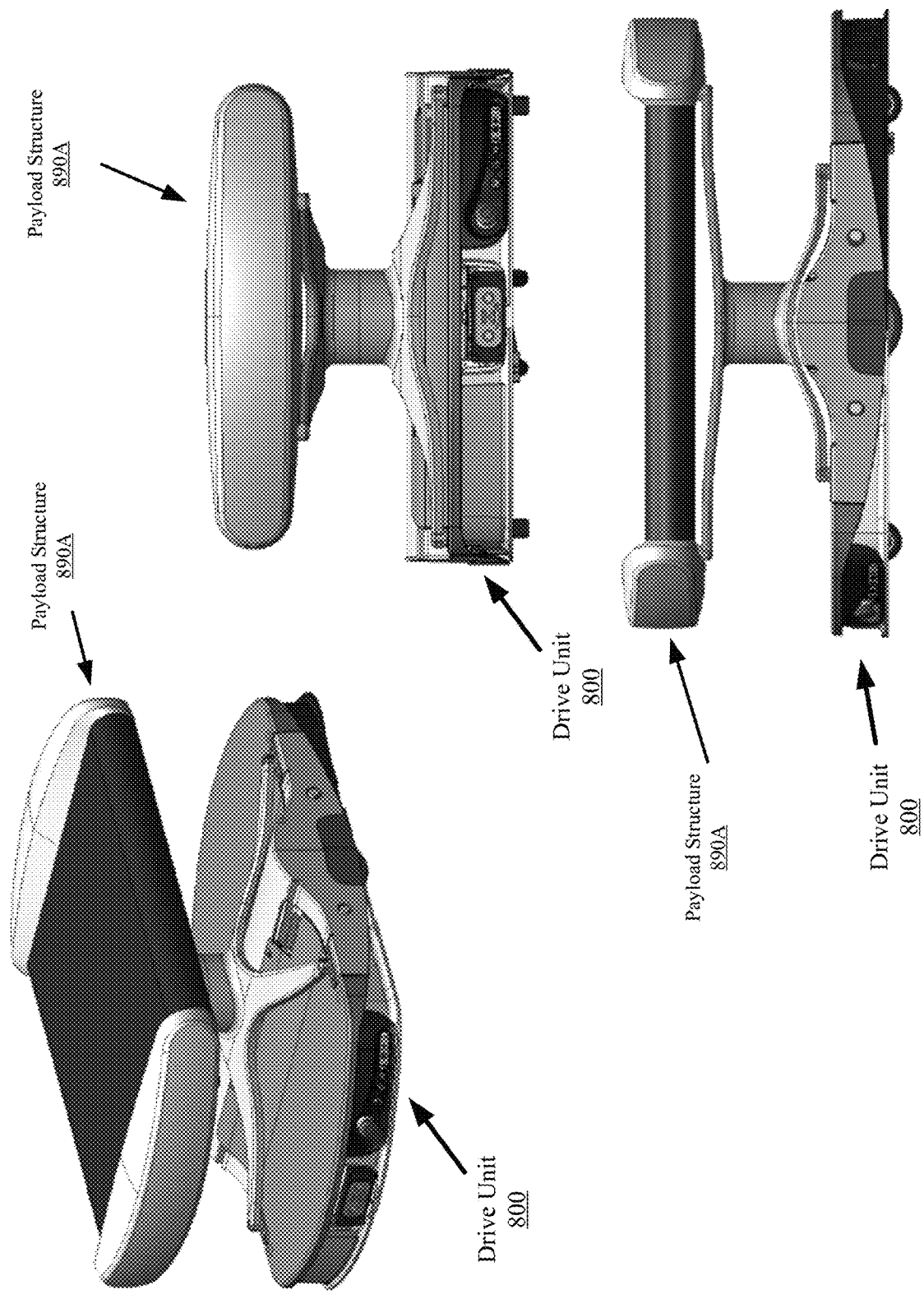

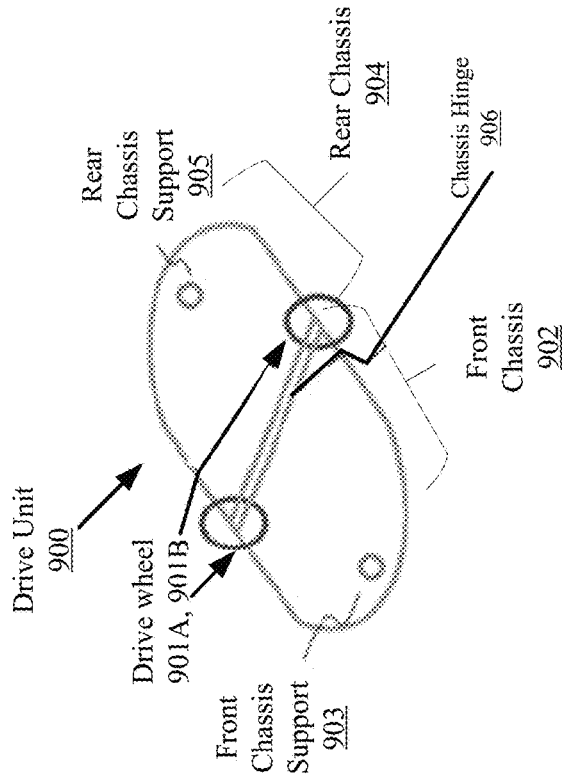
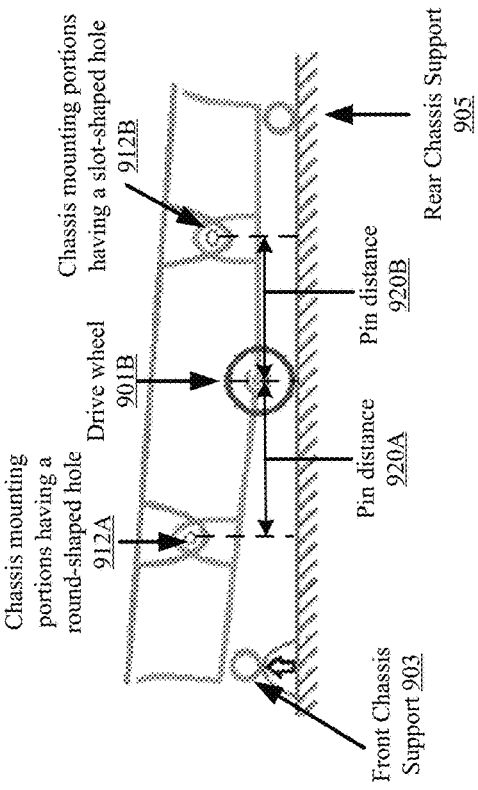
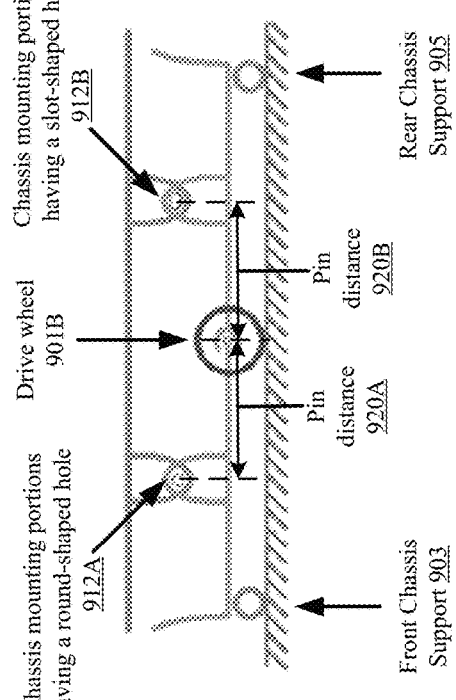

DRIVE UNIT WITH INTERFACE TO MOUNT AND IDENTIFY MULTIPLE DIFFERENT PAYLOAD STRUCTURES

CROSS-REFERENCE TO RELATED APPLICATION

This application claims the benefit of U.S. Provisional Patent Application No. 62/855,539, filed May 31, 2019, titled "Drive unit with interface to mount and identify multiple different payload structures", the entirety of which is hereby incorporated by reference herein.

BACKGROUND

Ground vehicles can operate in an environment to perform certain tasks, including the conveying of materials from one point to another. The environment may require the ground vehicles to transport many different types of materials to accommodate a variety of different applications. For example, the materials being transported can have a range of different shapes, sizes, weights, dimensions, etc. Since the environment may include other physical objects (e.g., workers, other ground vehicles, walls, equipment, etc.), safe conveyance and disposition of the variety of different materials is objects is desired.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIGS. 8A-8C illustrate multiple examples of payload structures 890 interchangeably coupled to a drive unit 800 via a mechanical interface, according to one or more embodiments.

FIGS. 9A-9C illustrate an example split chassis drive unit 900 with optimized pin distance to manage critical accelerations of a drive unit, according to one or more embodiments.

DETAILED DESCRIPTION

Figure 8B:
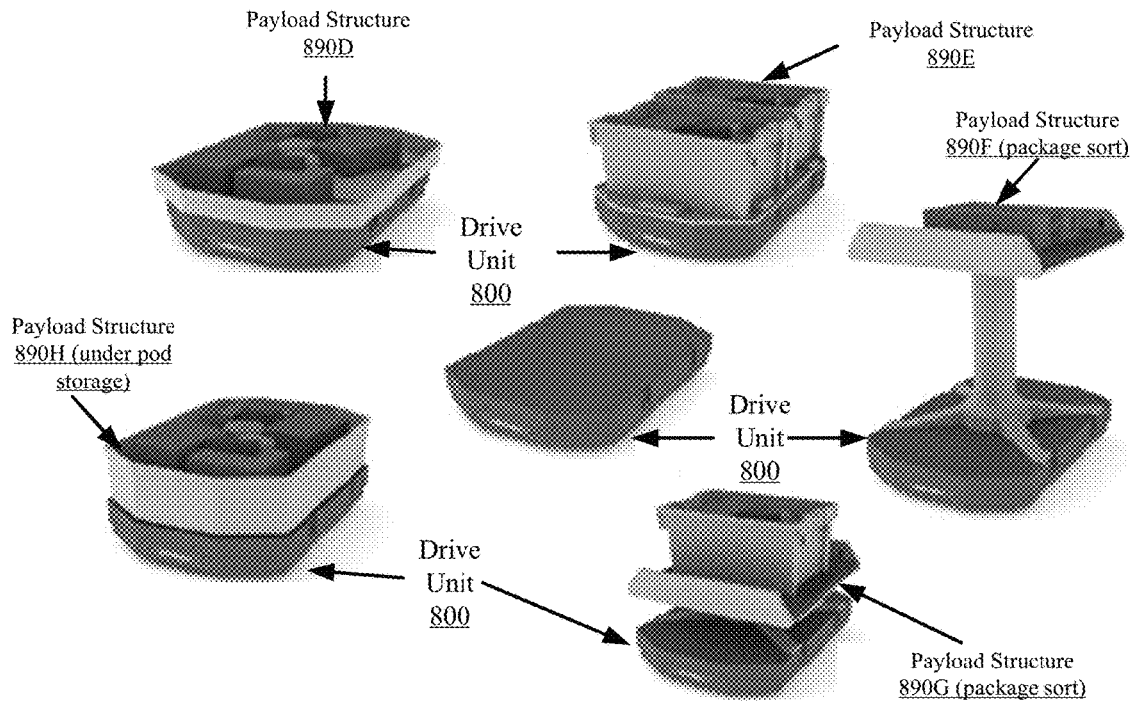
Figure 8C:
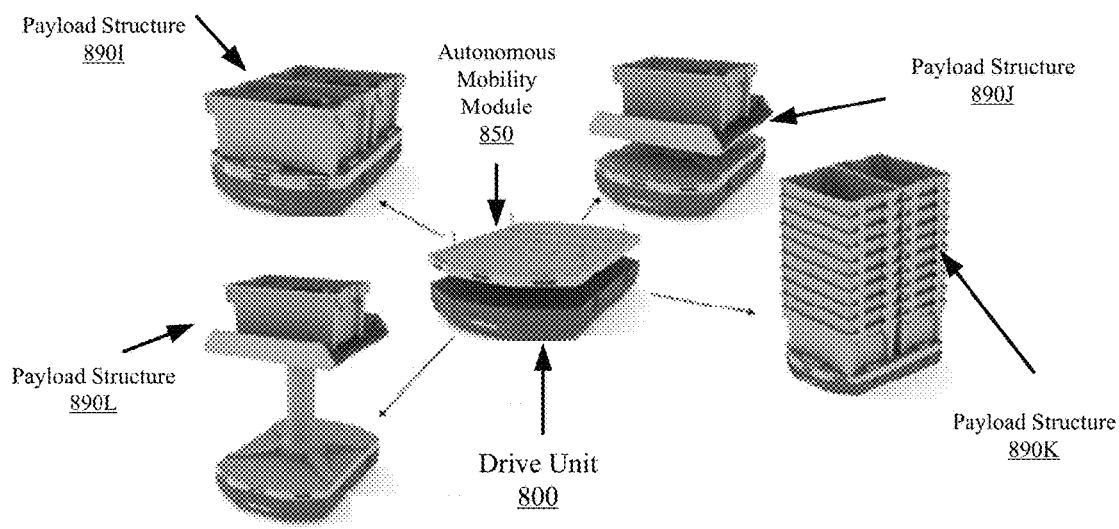

The present disclosure relates to a drive unit of a robotic vehicle including a top surface having a mounting interface to interchangeably couple with multiple different modular payload structures configured to transport items in a facility, workspace or inventory management environment. The mounting interface is configured to securely engage with a mounting portion of the variety of different payload structures to enable a versatile exchange of the payload structure for different conveyance applications. Example payload structures include an under pod storage structure, one more totes, a tote sort structure, a package sort structure, a tote stack structure, a high profile pedestal structure, a low profile pedestal structure, and the like. Example payload structures are shown in FIGS. 8A-8C.

The drive unit includes an electrical interface to electrically couple with the modular payload structures. The drive unit includes a payload identification module configured to use data communicated via the electrical coupling and interface to identify a type of modular payload structure that is mechanically coupled to the mounting interface. Upon identifying the modular payload structure type, a controller of the drive unit can implement a drive or motion profile (e.g., one or more drive parameters or rules to be used during the operation of the drive unit, such as speed and acceleration parameters) associated with the identified modular payload structure. In addition, one or more safety settings associated with the drive unit are established in view of the identified modular payload structure (e.g., one or more restricted areas the drive unit is not permitted to operate when mechanically coupled to a payload structure of a particular type). In this regard, detection of the type of payload structure can be used to set and execute the parameters and rules for the operation of the drive unit when mechanically coupled to the payload structure. Advantageously, different payload structures can have different customized drive and safety profiles.

Advantageously, upon mechanically and electrically coupling a modular payload structure to the drive unit, the payload structure is detected and the corresponding motion profile and safety parameters are established for operation of the drive unit with the particular payload structure mounted to the drive unit. For example, upon coupling a high profile pedestal structure, a corresponding motion profile including limitations relating to vertical clearance allowance, speed and acceleration can be established.

In an embodiment, the mounting interface includes multiple mounting pins located in corresponding locations on the drive unit to optimize stability and traction of the drive unit during operation.

The drive unit having the adaptable mechanical interface and payload identification module can be a component of an autonomous robot system that enables flexible, safe, efficient, and automated movement of payloads (e.g., goods and materials) in a dynamic environment including one or more dynamic objects (e.g., humans).

As described above, the embodiments described herein overcome the problems and challenges set forth above with respect to conventional drive units that are not configurable to interface mechanically and communicatively with multiple different types of payload structures for different conveyance applications. The embodiments of the present application are directed to a drive unit with a mechanical interface configured to mechanically interface with various different types of payload structures. Advantageously, the adaptable drive unit according to the present application can be deployed in an environment such that different payload structures can be interchanged for use with the drive unit.

In addition, the drive unit includes an electrical interface configured to electrically couple with an attached payload structure. The electrical interface is configured to receive or collect data from the attached payload structure for processing by a payload identification module of the drive unit. The payload identification module is a program or set of executable instructions configured to recognize or identify a type of payload structure that is connected to the drive unit. In response to identification of a payload structure type, the payload identification module determines a drive mode or profile associated with the identified payload structure. In an embodiment, the drive profile includes one more rules, constraints, specifications, limits, restrictions, etc. that are to be applied by the drive unit during operation with the associated payload structure. Advantageously, the drive unit detects and identifies the coupled payload structure and executes in a drive mode associated with the payload structure. In addition, when the payload structure is removed and a new payload structure is coupled to the mechanical and electrical interfaces of the drive unit, a new drive mode or profile associated with the new payload structure is detected and executed. This enables the safe, efficient, and dynamic changing of payload structures to a single drive unit. Furthermore, the drive unit can operate safely and efficiently in accordance with a drive mode or profile configured in view of each of the various different types of payload structures.

The various embodiments described below are directed to a type of drive unit configured for traveling with one of several different payload structures on the ground. The embodiments of the drive unit provide a solution that can be employed in an uncertainty environment including one or more unknown and dynamic obstacles, in accordance with a drive mode configured to satisfy the specifications of a particular payload structure coupled to the drive unit.

Figure 1:
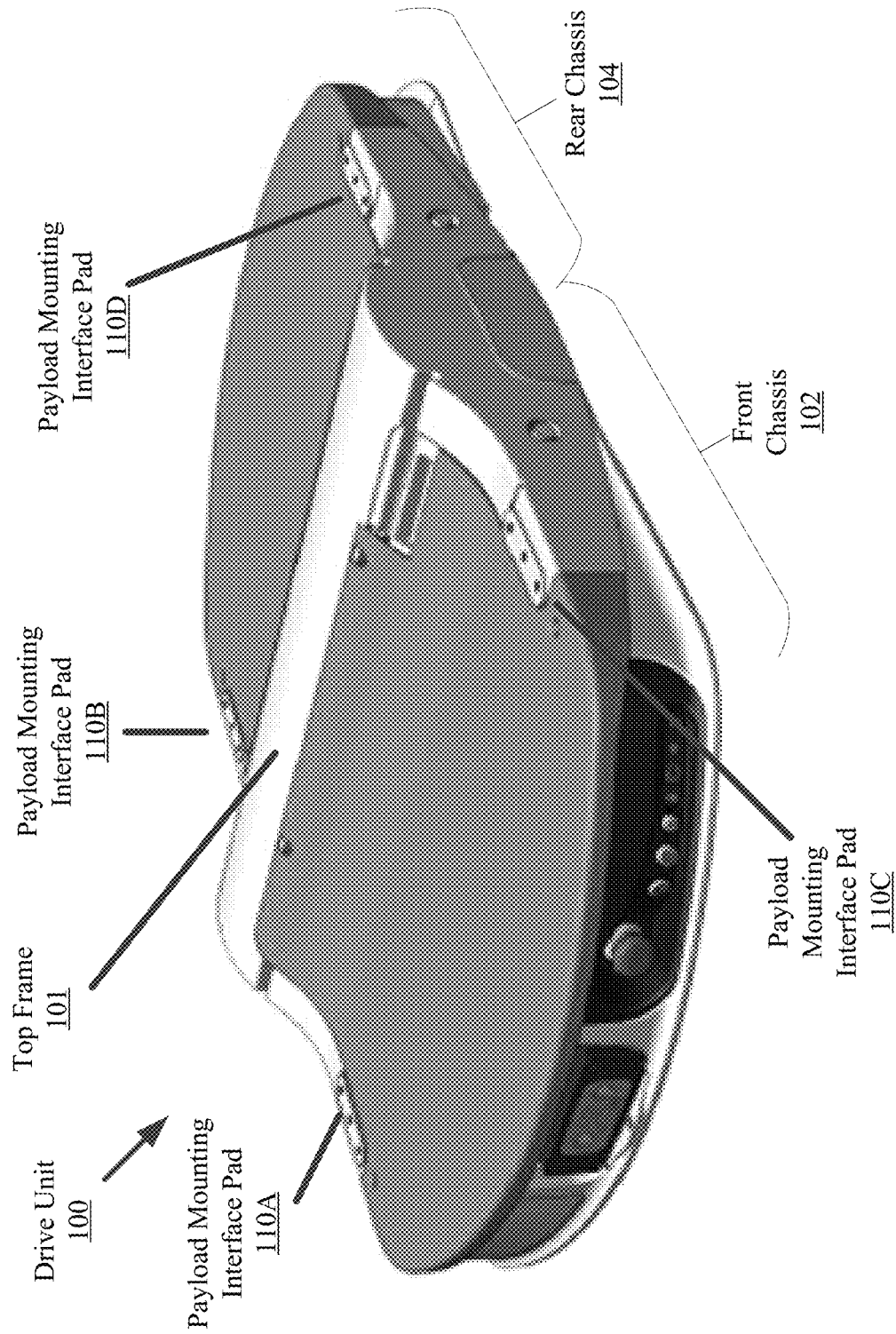
FIG. 1 illustrates an example drive unit including a mounting interface configured to mount multiple different payload structures, according to one or more embodiments.

FIG. 1 illustrates an example drive unit 100 including a mechanical interface configured to mechanically couple with multiple different payload structures, according to one embodiment. The drive unit 100 includes a dual chassis configuration having a front chassis 102 and a read chassis 104. The dual chassis configuration is described below in greater detail with respect to FIG. 9A.

In an embodiment, a top frame 101 of the drive unit 100 includes multiple payload mounting interface pads (110A, 110B, 110C, and 110D) configured to mechanically couple with a corresponding portion of a payload structure. Advantageously, the payload mounting interface (e.g., the set of payload mounting interfaces pads 110A-D) are adapted to mechanically couple and secure multiple different types of payload structures. Although the example mechanical interface shown in FIG. 1 include four payload mounting interface pads 110A-D including multiple holes or mounting points to mechanically secure a payload structure, it is noted that fewer or additional payload mounting interface pads may be employed. In addition, it is noted that the payload mounting interface pads 110A-D may be arranged, positioned, or placed in different locations on the drive unit 100 than those shown in FIG. 1. In an embodiment, the top frame 101 is mounted to the front chassis 102 and the rear chassis 104 using one or more mounting pins arranged on either side of the drive unit.

Figure 2:
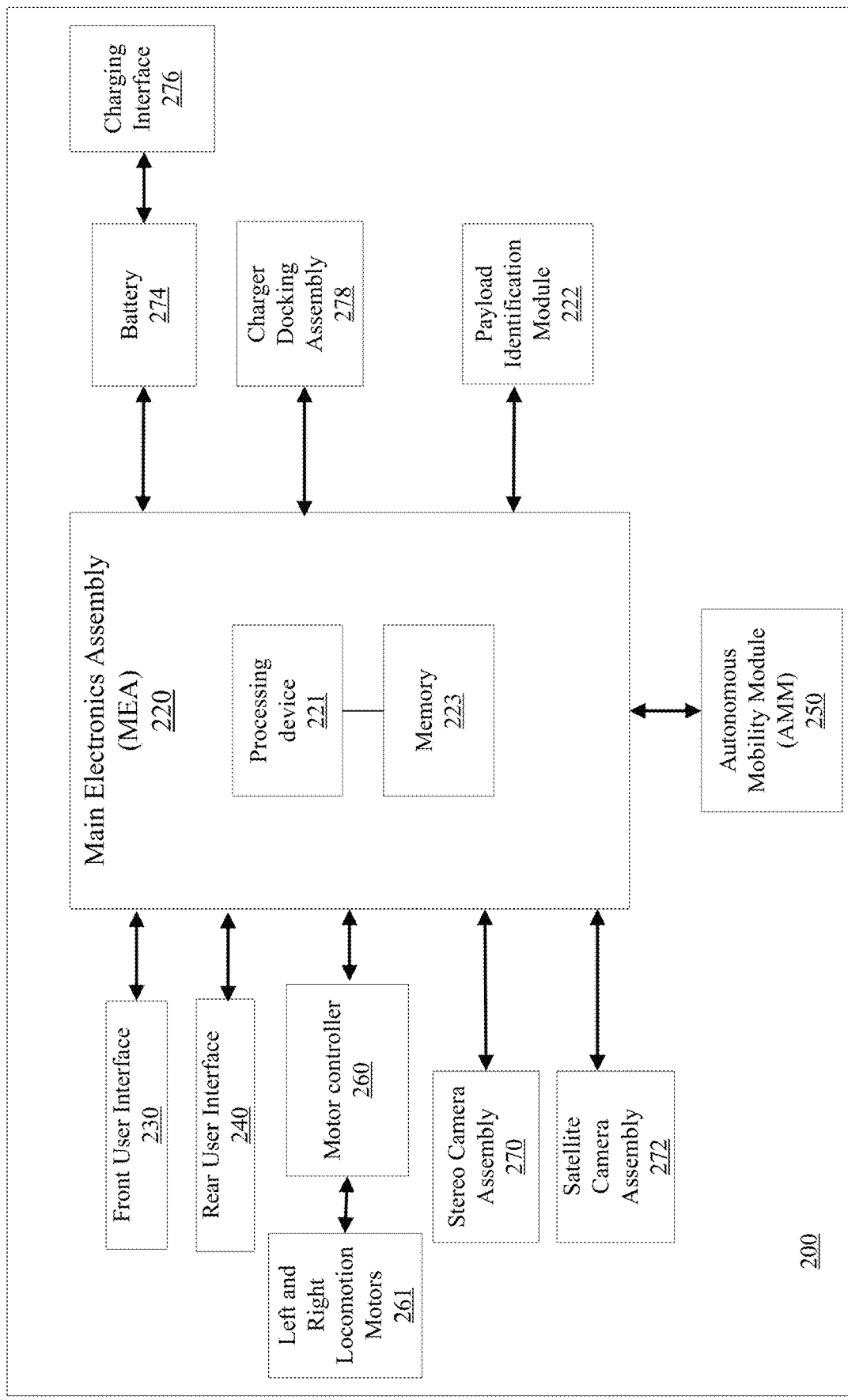
FIG. 2 illustrates example components of a drive unit, according to one or more embodiments.

FIG. 2 illustrates an example architecture example components of an example drive unit 200, according to an embodiment. In FIG. 2, the drive unit 200 includes a main electronics assembly (MEA) 220, a front user interface 230, a rear user interface 240, one or more sensors (e.g. a stereo camera assembly 270 and a satellite camera assembly 272), a battery 274, a charging interface 276, a charger docking assembly 278, and a payload identification module 222. In an embodiment, the drive unit 200 may be a component of an autonomous ground vehicle (AGV) and may further include an autonomous mobility module (AMM) 250 and motor controller 260. In an embodiment, the AMM is a subsystem including processing based on information collected from one or more sensors (e.g., the stereo camera assembly 270 and the satellite camera assembly 272) to perform functionality including object avoidance and speed modulation (e.g., motion planning, perception functions including object detection and classification), localization and mapping. In an embodiment, the motor controller 260 can communicate with the left and right locomotion motors 261 to process signals associated with driving commands in view of the drive mode and sensor data associated with the drive unit 200 and surrounding environment. It is noted that one or more of the example components described herein and shown in FIG. 2 may not be included in the drive unit 200, according to embodiments of the present application. In addition, the drive unit 200 can include additional components not shown in FIG. 2, including, for example, memory devices, one or more actuators, one or more processing device, additional data storage, a Global Positioning System (GPS) unit, radios, antennas, or the like. The radios may include cellular radios, wireless local area network (WLAN) radios, personal area network (PAN) radios, or the like. In addition, the drive unit 200 can include or be connected to one or more sensors, such as, for example, one or more cameras of one or more types, accelerometers, inertial sensors, temperature sensors, proximity sensors, infrared sensors, pressure sensors, light sensors, ultrasonic sensors, humidity sensors, wheel encoders, imaging/scanning light detection and ranging (LIDAR) sensor, an RGB-D sensor, one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers.

In an embodiment, the drive unit 200 includes the payload identification module 222 configured to detect a coupled payload structure, identify a type, category, or class of the coupled payload structure, and identify a drive mode or profile associated with the detected payload structure type. In an embodiment, the payload identification module 222 includes programmed instructions stored in memory 223 that are executable by one or more processing devices 221 of the MEA 220. In an embodiment, a tether or other electrical connector can be used to electrically connect the payload identification module 222 of the drive unit 200 to the electrically and mechanically coupled payload structure. In an embodiment, in response to establishing the electrical or communicative coupling with the payload structure, the payload identification module 222 collects information from the payload structure that can be used to identify the type or kind of payload that is attached.

In addition, the payload identification module 222 determines a corresponding drive mode to enable the drive unit 200 to operate safely and appropriately, such as, for example, operating in a mode that restricts motion to the appropriate acceleration profiles and available floor cells (e.g., including identifying areas that are restricted) for that payload structure. In an embodiment, the payload identification module 222 can store a mapping or other association between each payload structure type and a corresponding drive mode. For example, a first payload structure type can be mapped or associated with a first drive mode (or drive mode profile) that indicates one or more drive parameters to be employed when a payload structure of the first payload structure type is detected.

Figure 6:
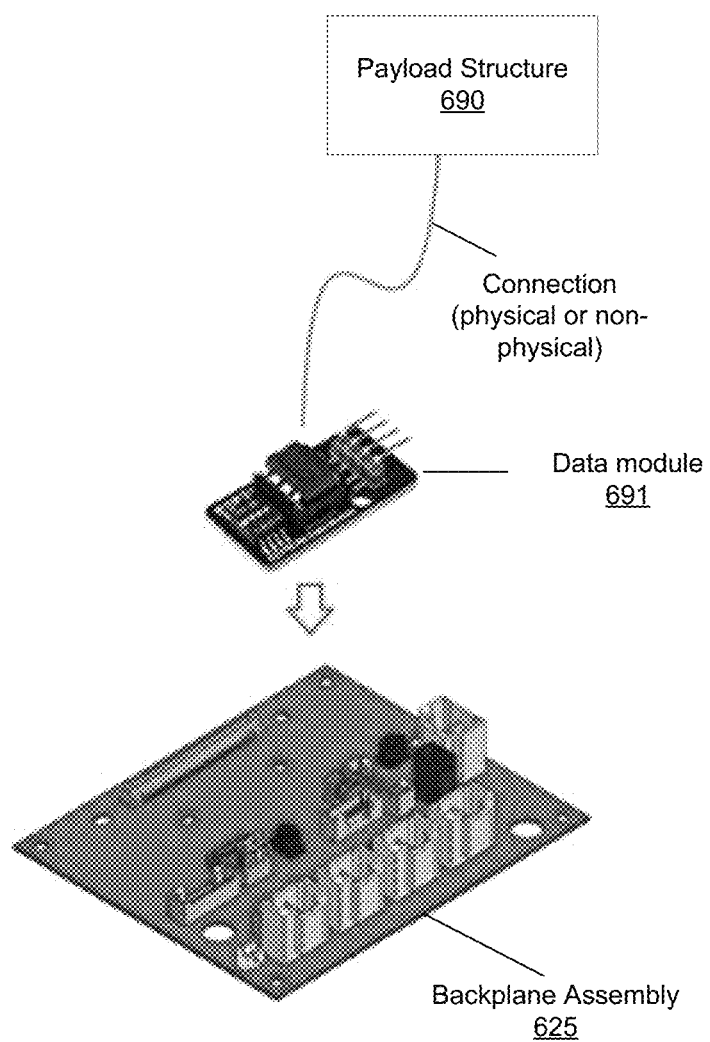
FIG. 6 illustrates an example system including a payload structure tethered to a data module configured to couple with a backplane assembly of a drive unit, according to one or more embodiments.
Figure 7:
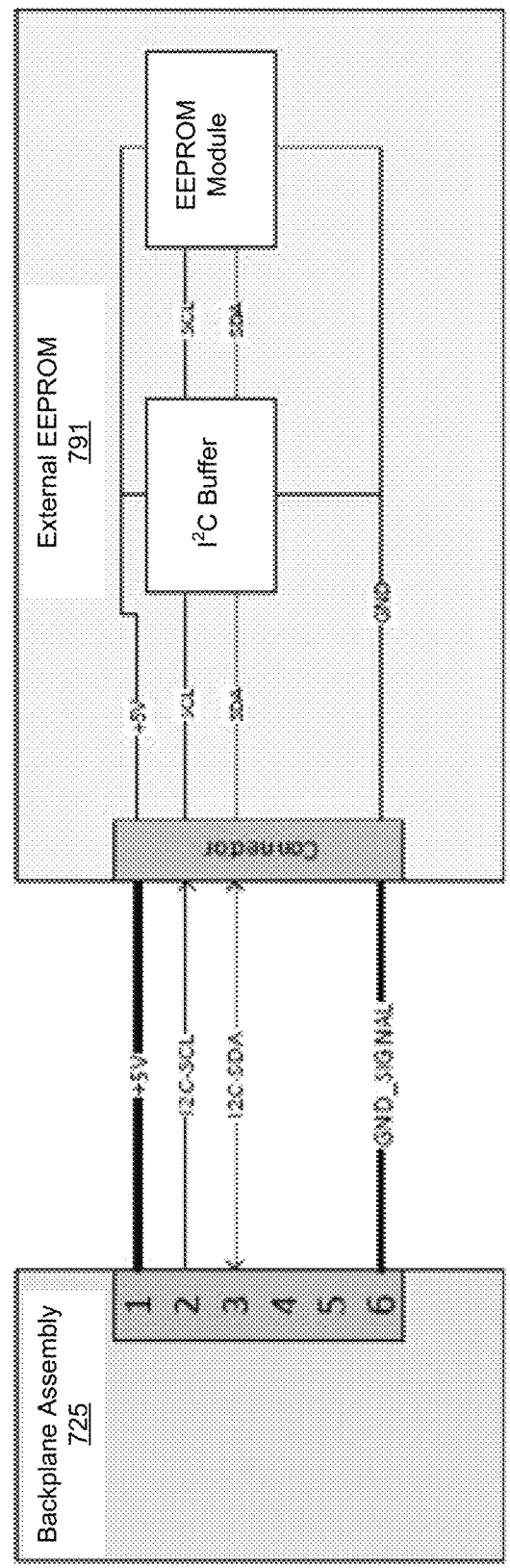
FIG. 7 illustrates an example system including a data module coupled to a backplane assembly for communication with a payload identification module of a drive unit, according to one or more embodiments.

In an embodiment, as shown in FIG. 6, the payload structure 690 can be connected via a tether to a pre-programmed data module 691 configured to communicate with the payload identification module 222. The pre-programmed data module 691 (e.g., an EEPROM data module) can connect to a backplane assembly 625 of the drive unit. In an embodiment, the backplane assembly 625 of the drive unit is configured to accept the data module 691 from the payload structure to collect and identify information use to identify the payload structure (e.g., the payload information) and determine the drive mode to enable system performance and traceability. In an embodiment, the payload information is specific to the type of payload structure that is attached to the drive unit. In an embodiment, the data module 691 may include an external EEPROM. FIG. 7 illustrates an example external EEPROM 791 coupled to a backplane assembly 725 of a drive unit.

With reference to FIG. 2, in an embodiment, the drive unit 200 is configured to provide real time resource planning and path optimization to enable the drive unit to operate safely and efficiently alongside humans in a dynamic environment (e.g., a warehouse or fulfillment facility) with the particular modular payload structure that is attached to the drive unit 200.

In an embodiment, drive mode information corresponding to the payload structure coupled to the drive unit can be provided to the left and right locomotion motors 261 by the motor controller 260 to establish a path and trajectory for the drive unit 200 that enables real-time dynamic obstacle sensing and avoidance. The drive unit 200 is configured to interpret the current environment including detected dynamic objects and determines updated or adjusted trajectory data to provide to the motor controller 260 for generating drive instructions for execution by the left and right locomotion motors 261.

Figure 3:
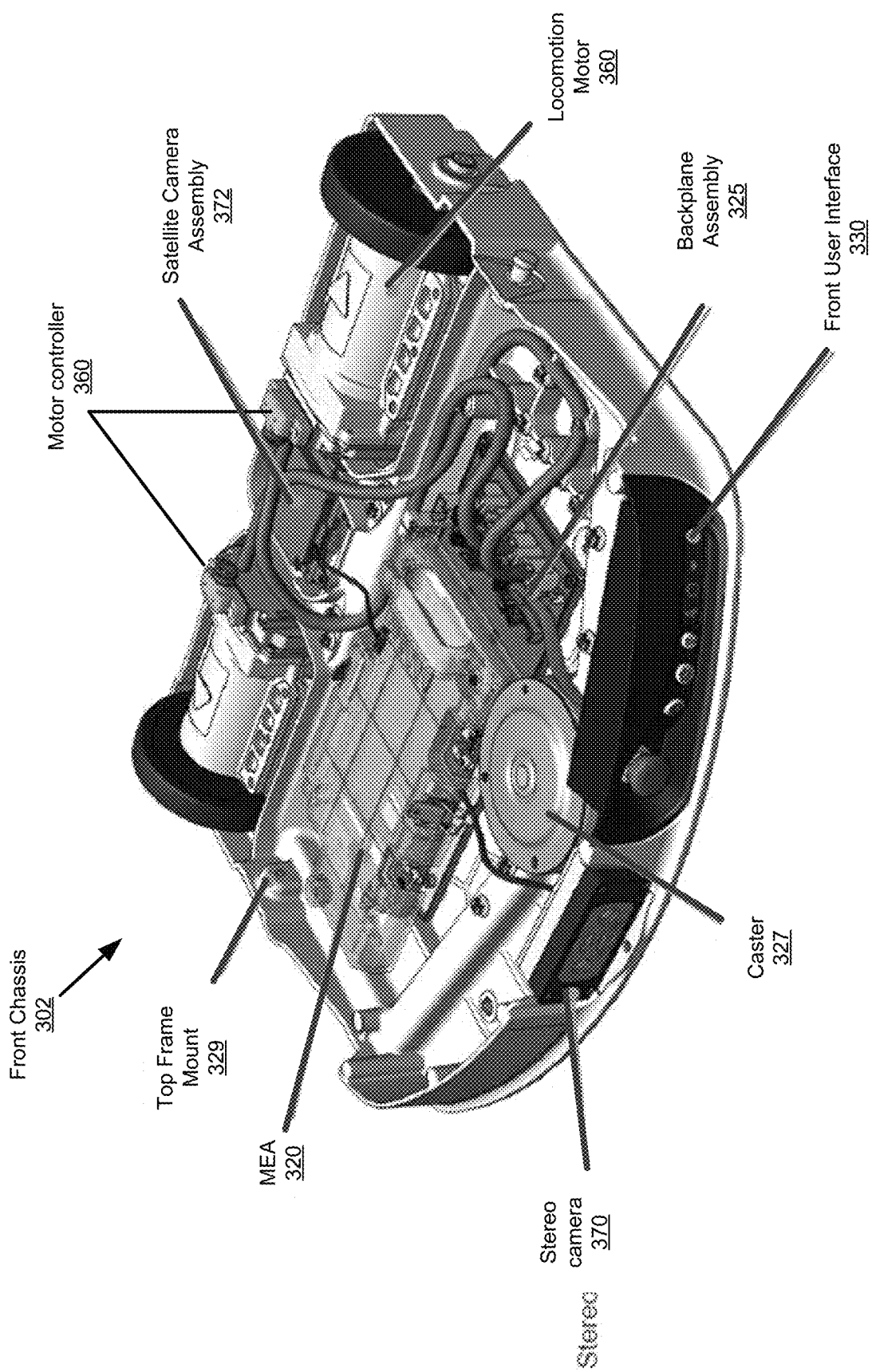
FIG. 3 illustrates example components of a front chassis of a split chassis drive unit, according to one or more embodiments.

In an embodiment, the drive unit can be configured in a split chassis configuration including a front chassis and a rear chassis. FIG. 3 illustrates an example front chassis 302 of a drive unit according to embodiments of the present application. As shown in FIG. 3, an example front chassis may include the MEA 320, a stereo camera 370 (or other suitable sensor), a caster 327 (e.g., a low profile caster plate), a top frame mount 329, a satellite camera assembly 372, the motor controller 360, a backplane assembly 325, and a front user interface 330. In an embodiment, the components within the front chassis 302 can be arranged to optimize the utilization of the area or space within the form factor of the drive unit. For example, in an embodiment, the split-chassis drive unit may have an approximate length of 36.9 inches and an approximate width of 25.7 inches. In addition, the split-chassis drive unit can be configured to satisfy desired drive and performance specifications, such as maximum item capacity (e.g., 30 pounds), maximum payload (e.g., 100 pounds), drive mass (e.g., 80 pounds), top speed (e.g., 2.0 m/s), top acceleration (e.g., 2.0 m/s$^2$), etc.

Figure 4:
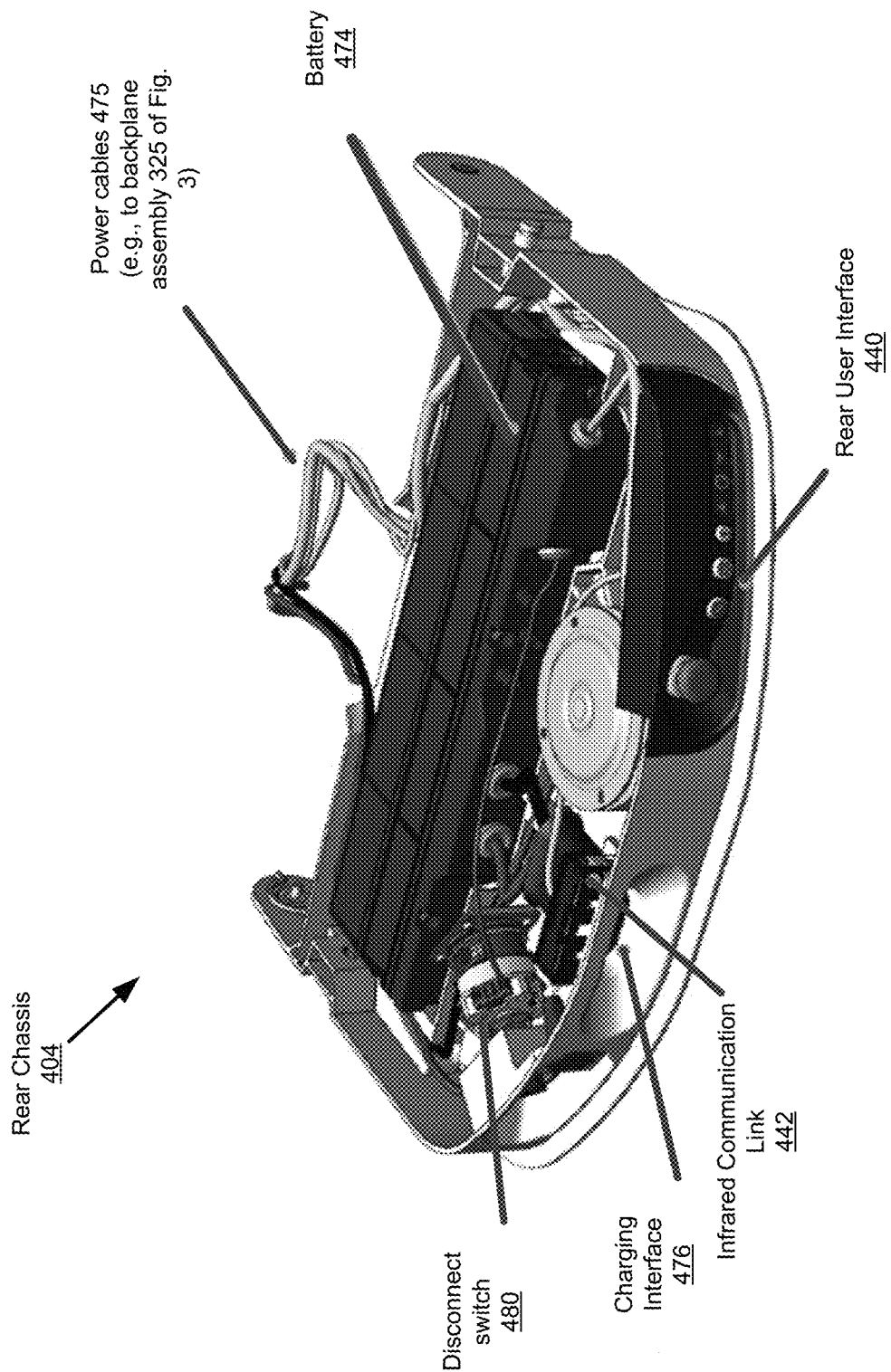
FIG. 4 illustrates example components of a rear chassis of a split chassis drive unit, according to one or more embodiments.

FIG. 4 illustrates an example rear chassis 404 of the split chassis drive unit, according to embodiments of the present application. As shown, the rear chassis 404 may include a disconnect switch 480, a charging interface 476, an infrared communication link 442, a rear user interface 440, a battery 474, and one or more power cables 475 (e.g., power cables 475 connectable to the backplane assembly 325 of FIG. 3.) In an embodiment, the arrangement of the components within the front chassis 302 and the rear chassis 404 enable an optimization and efficiency in a unique part count and total part count of the drive unit. For example, the drive unit may have a unique part count of approximately sixty-three (63) (as compared to conventional drive units having a unique part count ranging from one hundred fifty (150) to over three hundred (300) parts) and a total part count of approximately one hundred fifty seven (157) (as compared to conventional drive units having a total part count ranging from six hundred (600) to over one thousand one hundred (1100) parts).

Figure 5:
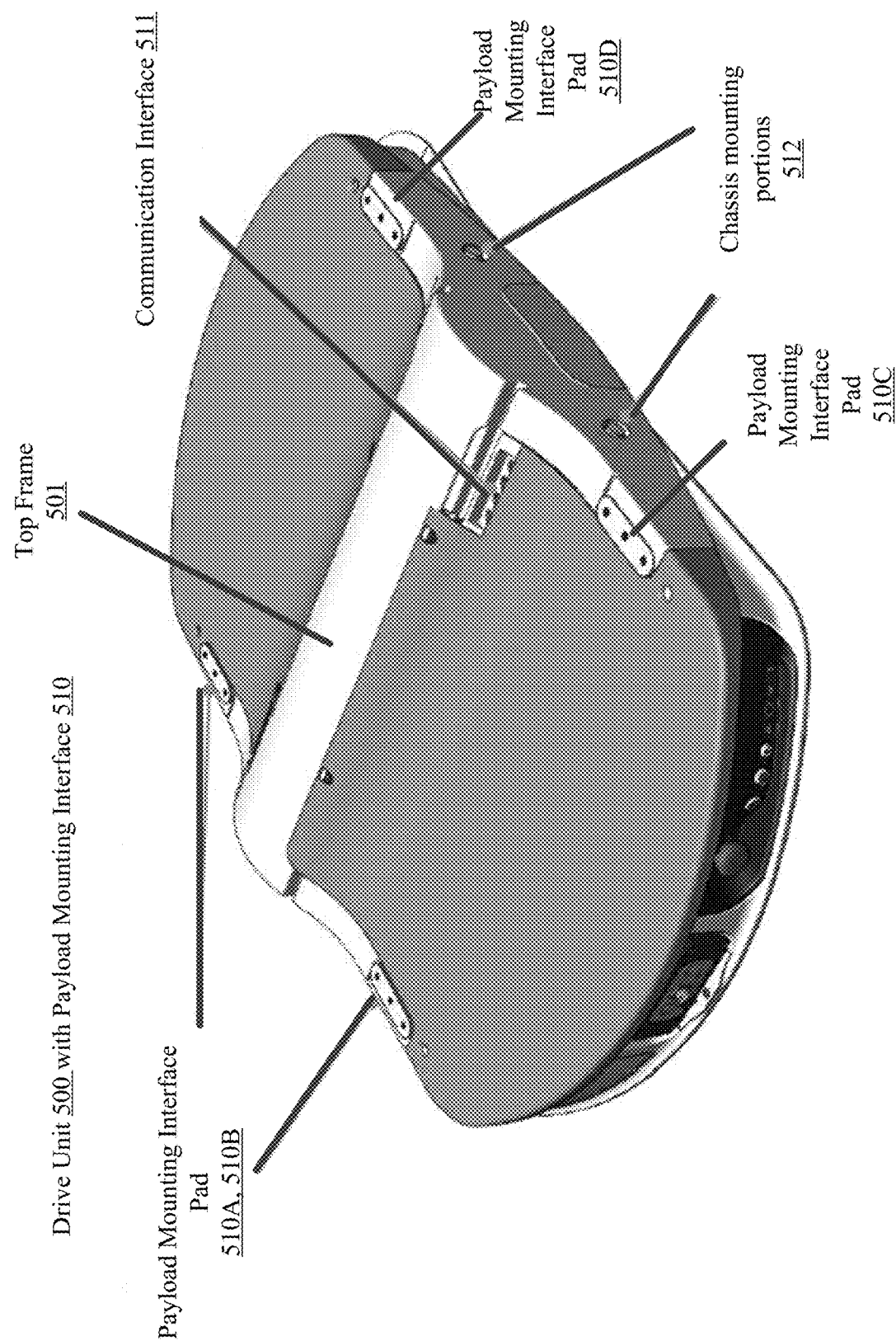
FIG. 5 depicts an example payload mounting interface of a drive unit, according to one or more embodiments.

FIG. 5 illustrates an example drive unit 500 with a top frame 501 including a payload mounting interface 510 configured to mechanically couple with multiple different types of payload structures, according to embodiments of the present application. As shown in FIG. 5, the payload mounting interface 510 may include multiple payload mounting interface pads 510A, 510B, 510C, 510D. The payload mounting interface pads 510A-D are portions or areas of an outer cover of drive unit that are adapted to mechanically couple and secure corresponding portions of the payload structure. According to embodiments, the payload mounting interface pad 510A-510D may include any suitable coupling mechanism or structure configured to join, mate, couple, attach, engage, or interlock with the payload structure to form a stable and secure mechanical coupling. In an embodiment, each of the payload mounting interface pads 510A-510D may include a number of holes or other engagement mechanism to enable a mechanical coupling with a corresponding portion of a payload structure. Advantageously, the payload mounting interface pads 510A-510D are configured to mechanically couple with a variety of different modular payload structures (e.g., the payload structures shown in FIGS. 8A-8C). In addition, payload mounting interface pads 510A-510D are arranged and configured to enable a first payload structure to be mechanically coupled to the drive unit 500 and removed from the drive unit 500 to allow a different payload structure to be mounted to the drive unit 500.

As shown in FIG. 5, the drive unit also includes a communication interface 511 configured to enable communication of the payload information between the payload structure and the payload identification module 222 to enable identification of the payload structure from the multiple different payload structures that are interchangeably mountable on the drive unit 500. In an embodiment, the interface may enable electrical coupling between the payload structure and one or more components of the drive unit. In an embodiment, the payload structure may include a component configured to electrically couple with the drive unit via the interface 511. In an embodiment, payload information may be collected by the payload identification module via the communication interface 511.

In an embodiment, the drive unit 500 include multiple chassis mounting portions 512 for connecting or mounting the front chassis and the rear chassis to one another. Although two chassis mounting portions 512 are shown in FIG. 5, it is to be appreciated that two additional and corresponding chassis mounting portions on the opposite side of the drive unit. In the example shown in FIG. 5, the chassis mounting portions 512 include a screw or pin and corresponding hole or opening arrangement to enable the front chassis and read chassis to be connected to one another. It is noted that in addition to the screw-hole arrangement shown in FIG. 5, alternative coupling mechanisms may be employed to enable the connecting of the front chassis to the rear chassis.

As discussed above, FIG. 6 illustrates an example wherein the payload structure 690 is communicatively connected via a tether or other suitable mechanism to a data module 691. In an embodiment, the payload structure 690 can be communicatively coupled to the drive unit with a physical connection (e.g., using a tether, as shown in FIG. 6) or non-physical connection (e.g., a wireless connection, RFID, bar code scanner, DIP switches, etc.) In an example, the drive unit can include a sensor or a camera configured to read the payload structure 690 to identify information to be used to by the payload identification module to identify the type of payload structure. Furthermore, as described above, FIG. 7 illustrates an example external EEPROM 791 (including a connector, I²C buffer and EEPROM module) coupled to the backplane assembly 725 of the drive unit to enable communication of the payload information to the payload identification module 222. The communicative coupling or connection between the payload structure 690 and the drive unit includes the sending of at least one signal including information relating to the payload structure 690 to be used to identify the payload structure type.

FIGS. 8A-8C illustrate multiple examples of payload structures 890 interchangeably coupled to a drive unit 800 via a mechanical interface, as described in detail above. According to embodiments, the various example payload structures illustrated in FIGS. 8A-8C can be mechanically and communicatively coupled to the drive unit 800 or drive unit 800 having an autonomous mobility module 850. In each instance, the payload structure 890 can be mounted, removed, and replaced with a different payload structure 890. In particular, FIG. 8A illustrates multiple views of a drive unit 800 mechanically coupled to a payload structure 890A (e.g., a tote sort structure). FIG. 8B, illustrates an example drive unit 800 mechanically coupled to multiple different modular payload structures including payload structure 890D (e.g., an under pod storage structure), payload structure 890E (e.g., a tote movement structure), payload structure 890F (e.g., a package sort structure), payload structure 890G (e.g., a package sort structure), and payload structure 890H (e.g., an under pod storage structure).

FIG. 8C illustrates an example drive unit 800 including an autonomous mobility module 850 having the mounting interface (e.g., the payload mounting interface pads) for interchangeably coupling with multiple different payload structures including example payload structure 8901 (e.g., autonomous tote mover structure), payload structure 890J (e.g., autonomous tote sort structure), payload structure 890K (e.g., autonomous tote stack mover structure), and payload structure 890L (e.g., autonomous sort structure).

FIGS. 9A-9C illustrate an example split chassis drive unit 900, according to embodiments of the present application. As shown in FIGS. 9A-9C, the split chassis drive unit 900 includes a front chassis 902, a rear chassis 904, a chassis hinge 906, drive wheels 901A, 901B, a front chassis support wheel 903 and a rear chassis support wheel 904. In an embodiment, as shown in FIGS. 9B and 9C, a top frame is mounted to the front chassis 902 and the rear chassis 904 via one or more chassis mounting portions (e.g., mounting pins) 912. In an embodiment, the split chassis drive unit 900 is configured to maintain the top frame in a rigid or stable position (e.g., to maintain the mounting interface and corresponding payload structure in a rigid or stable position) as the lower chassis 904 articulates, such that the payload structure and items arranged thereon do not require further design features to account for relative motion. In an embodiment, the rigidity of the top frame including the mounting interface is maintained by mounting the top frame to a round-shaped aperture, hole or opening 912A on the front of the drive unit 900 and to a slot-shaped aperture, hole, or opening 912B in the rear of the drive unit 900, as shown in FIGS. 9B and 9C.

In an embodiment, the round-shaped hole 912A and the slot-shaped hole 912B (and corresponding pins secured with the respective holes) are spaced apart at an optimized distance relative to the drive wheel (herein referred to as the "pin distance"). For example, if the pin distance 920A, 920B is too great (i.e., the pins are spaced too far from the drive wheel), then more force of weight from the payload structure will be routed into the support wheels (e.g., caster wheels), thereby producing sub-optimal traction and wheel slip at relatively low accelerations (i.e., a slip condition). In another example, if the pins are spaced too close to the drive wheel, the chassis will become unstable and can lift and tip over at relatively low accelerations (i.e. a lift condition). To address these deficiencies, the drive unit 900 is configured to select a pin distance that allows for a greatest acceleration of the drive unit 900 before encountering either the slip or the lift condition. In an embodiment, the pin distance 920A may be the same or different than the distance 920B.

In an embodiment, the pin distance(s) 920A, 920B can be selected to account for different payload structures having different centers of gravity. In an embodiment, the respective centers of gravity of a set of multiple different payload structures can be analyzed to identify a payload structure in the set that is the most unstable (e.g., the most prone to tipping or tilting). In an embodiment, the pin distances 920A, 920B are selected based on the identified payload structure having the greatest instability (e.g., the lowest lift or slip acceleration), thereby accounting for the centers of gravity of the multiple different payload structure types.

Figure 10:
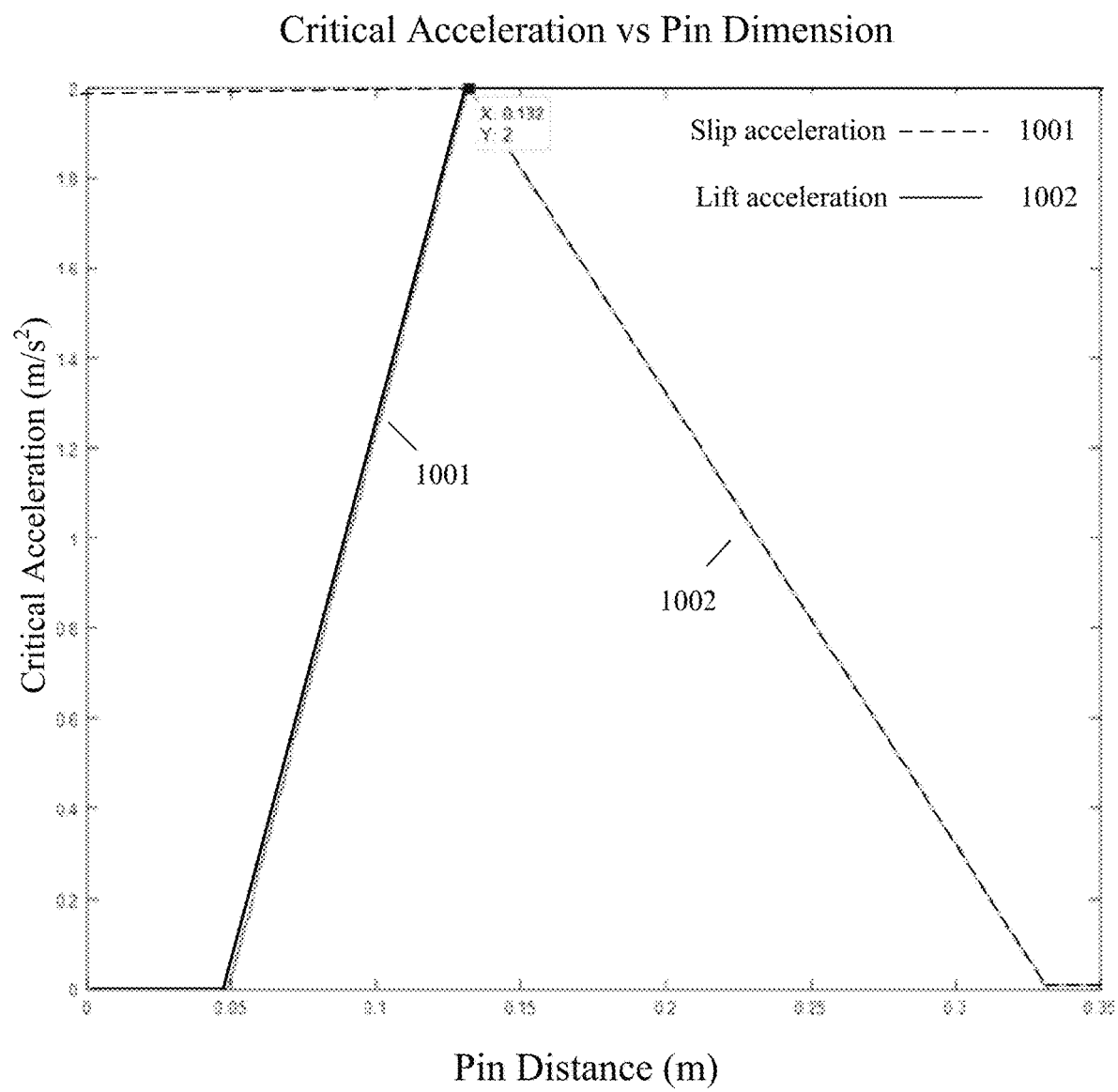
FIG. 10 illustrates a graph depicting a critical acceleration of a drive unit as a function of a distance associated with mounting locations for a top frame of a drive unit, according to one or more embodiments.

FIG. 10 illustrates a graph depicting a critical acceleration (e.g., a slip acceleration 1001 and a lift acceleration 1002) of a drive unit as a function of the pin distance. In an embodiment, an optimal pin distance is determined in view of a maximum slip acceleration 1001 and lift acceleration 1002. In the example shown in FIG. 10, an optimal or selected pin distance of 0.132 m is determined in view of the corresponding slip acceleration 1001 and lift acceleration optimized at a value of 2 m/s². In an embodiment, the mounting pins (and corresponding round-shaped hole 912A and slot-shaped hole 912B) in FIGS. 9B and 9C can be arranged at a pin distance of 0.132 m from the corresponding drive wheel (e.g., drive wheel 901B of FIGS. 9B and 9C).

Figure 11:
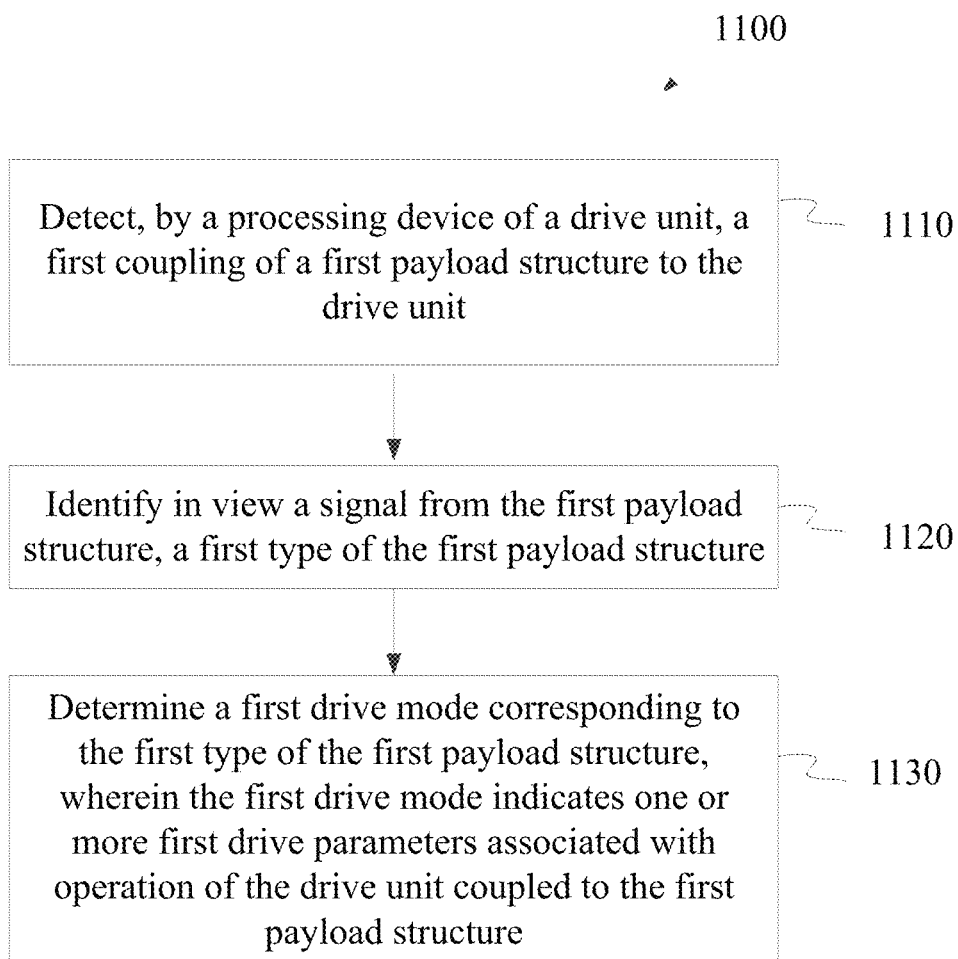
FIG. 11 depicts a flowchart illustrating example functionality implemented by a payload identification module of a drive unit, according to one or more embodiments.

FIG. 11 depicts a flowchart illustrating example functionality implemented by a payload identification module (e.g., payload identification module 222 of FIG. 2) to identify and manage multiple different payload structures that are mountable on a drive unit, according to various embodiments of the present disclosure. It is understood that the flowchart of FIG. 11 provides an example of the many different types of functional arrangements that may be employed to implement the operation of the payload identification module as described herein. The processing flow method 1100 of FIG. 11 may be performed by processing logic of the payload identification module (e.g., of a drive unit) that comprises hardware (e.g., circuitry, dedicated logic, programmable logic, microcode, etc.), software (e.g., instructions run on a processing device to perform hardware simulation), or a combination thereof. The operations of method 1100 may be performed in any order so as to fit the needs of the functionality to be provided.

In block 1110, processing logic detects a first coupling of a first payload structure to a drive unit. In an embodiment, the first payload structure is communicatively coupled to the drive unit via a suitable communication mechanism including, for example, a wired communication (e.g., a cable or other tether), a wireless communication (e.g. a Bluetooth communication, a Wifi communication, a radio-frequency identification (RFID) communication, etc.), or other mechanism to transmit one or more signals from the processing logic and a corresponding system or program of the first payload structure.

In block 1120, processing logic identifies, in view a signal from the first payload structure, a first type of the first payload structure. In an embodiment, the signal or set of signals include information that can be processed by the processing logic to identify the payload structure type. In an embodiment, the information can include an identifier or other similar data that can be recognized by the processing logic and associated with one of multiple different payload structure types (e.g., a tote sort structure, an under pod storage structure, a package sort structure, an under pod storage structure, a tote stack mover structure, etc.) In an embodiment, the processing logic can store multiple different payload structure types and corresponding identifying information to determine the type of payload structure coupled to the drive unit.

In block 1130 the processing logic determines a first drive mode corresponding to the first type of the first payload structure, wherein the first drive mode indicates one or more first drive parameters associated with operation of the drive unit coupled to the first payload structure. In an embodiment, the processing logic stores a mapping or association between each type of payload structure and a corresponding drive mode. In an embodiment, the processing logic can process the identified drive mode to enable control of the drive unit in accordance with the drive mode. For example, the drive mode or motion profile can include one or more parameters, thresholds, rules, motion plans, etc. that can be transmitted to one or more components of the drive unit configured to control the operation of the drive unit (e.g., the motor controller, the locomotion motors, the AMM, etc.) In an embodiment, the drive mode or motion profile associated with the type of payload structure can include one or more settings, thresholds, rules, etc. corresponding to one or more first drive parameters of the drive unit including a speed of the drive unit (e.g., a maximum speed) or an acceleration (e.g., a maximum acceleration, an optimal rate of acceleration, etc.) of the drive unit when it is coupled to that particular type of payload structure.

In an embodiment, the first payload structure can be disconnected from the drive unit and interchanged with a second payload structure (e.g. a different type of payload structure). In an embodiment, a different payload structure (e.g., a second payload structure) having a different payload structure type can be coupled to the same drive unit. The processing logic of the drive unit can then detect the newly coupled payload structure and identify the type of the second payload structure. In an embodiment, the type of the newly connected payload structure can be different from the first payload structure and be associated with a different drive mode or motion profile (e.g., the motion profile for the second payload structure type can include different drive parameters than the motion profile for the first payload structure type).

Figure 12:
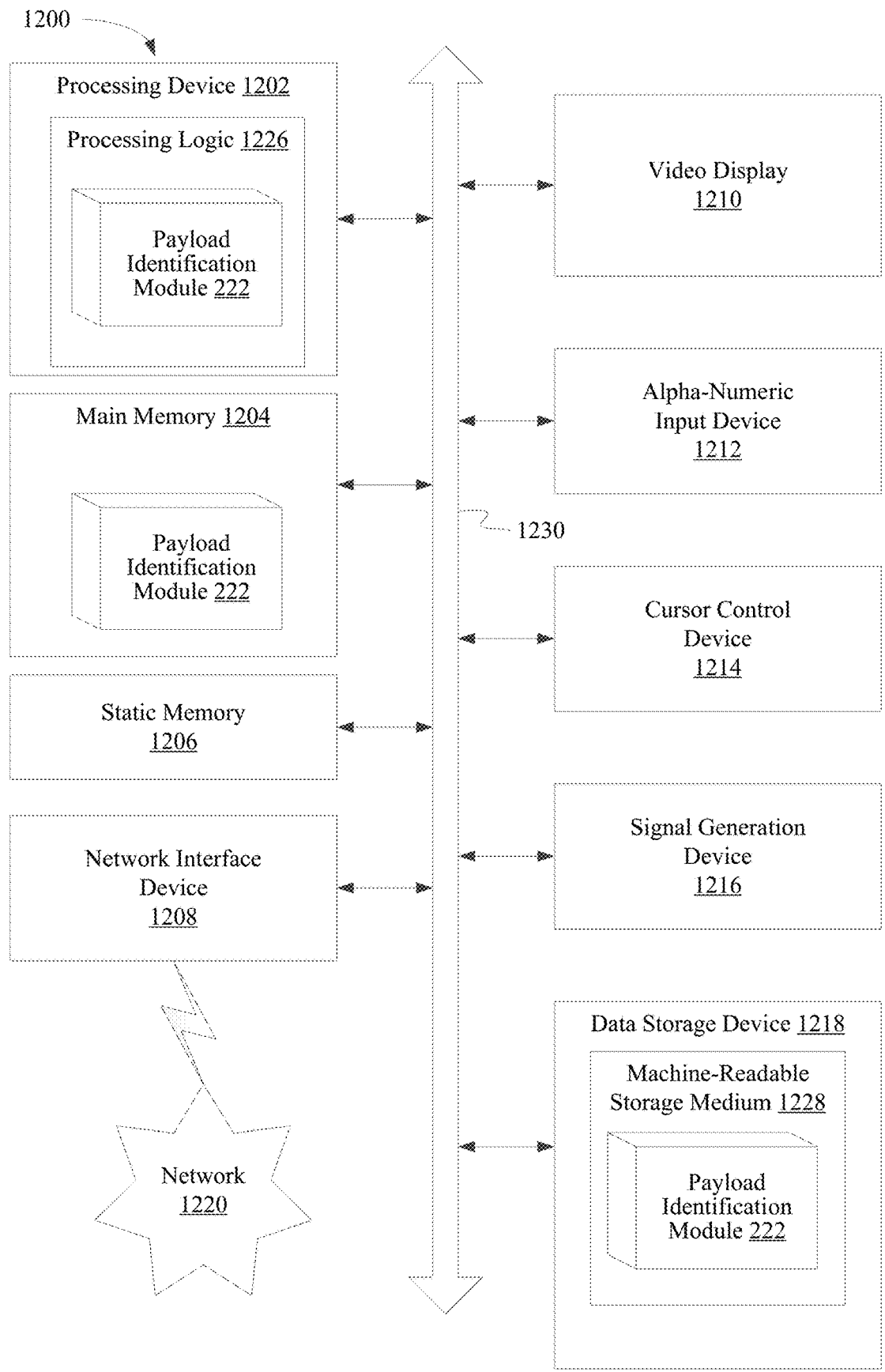
FIG. 12 illustrates a diagrammatic representation of a machine in the example form of a computer system including a set of instructions executable by a computer to identify a modular payload structure coupled to a drive unit, according to one or more embodiments.

FIG. 12 illustrates a diagrammatic representation of a machine in the example form of a computer system 1200 including a set of instructions executable by a computer to manage different payload structures that can be interchangeably mounted and coupled to a drive unit according to any one or more of the methodologies discussed herein. In one embodiment, the computer may include instructions to enable execution of the processes and corresponding components shown and described in connection with FIGS. 1-11.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. In various implementations of the present disclosure, the processing device 1202 is configured to execute instructions for the payload identification module 222 for performing the operations and processes described herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable storage medium 1228 (or machine-readable medium) on which is stored one or more sets of instructions of the payload identification module 222 embodying any one or more of the methodologies or functions described herein. The instructions may also reside, completely or at least partially, within the main memory 1204 and/or within processing logic 1226 of the processing device 1202 during execution thereof by the computer system 1200, the main memory 1204 and the processing device 1202 also constituting computer-readable media.

The instructions may further be transmitted or received over a network 1220 via the network interface device 1208. While the computer-readable storage medium 1228 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as: detecting", "identifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A drive unit comprising:
    a front chassis comprising:
        a set of drive wheels comprising a first drive wheel and a second drive wheel;
        a first front chassis side comprising a first front mounting pin spaced at a pin distance from the first drive wheel, wherein the pin distance is determined in view of at least one of a slip acceleration or a lift acceleration of the drive unit;
        a second front chassis side comprising a second front mounting pin;
    a rear chassis coupled to the front chassis, the rear chassis comprising:
        a first rear chassis side comprising a first rear mounting pin spaced at the pin distance from the first drive wheel; and a second rear chassis side comprising a second rear mounting pin;
a top frame comprising a plurality of mounting portions configured to interchangeably couple with at least two different payload structures; wherein the top frame is mounted to the front chassis via the first front mounting pin and the second front mounting pin; and wherein the top frame is mounted to the rear chassis via the first rear mounting pin and the second rear mounting pin; the top frame comprising a plurality of mounting pads configured to interchangeably couple with at least two different payload structures; and
a payload identification module, executable by a processing device, to communicatively couple with a payload structure of the at least two different payload structures, the payload identification module to:
 detect an electrical coupling of the payload structure;
 identify a first payload structure type of the payload structure based on data communicated via the electrical coupling;
 store a mapping between each payload structure type of a set of payload structure types and a corresponding drive mode; and
 determine, using the mapping, a first drive mode corresponding to the first payload structure type of the payload structure, wherein the first drive mode indicates a set of drive parameters associated with operation of the drive unit when coupled to the first payload structure type, wherein the set of drive parameters comprises an indication of one or more restricted areas of motion of the drive unit when coupled to the first payload structure type.

2. The drive unit of claim 1, wherein the second front mounting pin is spaced at the pin distance from the second drive wheel; and wherein the second rear mounting pin is spaced at the pin distance from the second drive wheel.

3. The drive unit of claim 1, the top frame comprising a communication interface configured to communicatively couple with the payload structure and the payload identification module.

4. The drive unit of claim 1, further comprising a controller to adjust the set of drive parameters in accordance with the first drive mode corresponding to the first payload structure type, wherein the set of drive parameters comprises at least one of a speed of the drive unit or an acceleration of the drive unit.

5. A drive unit comprising:
a front chassis;
a rear chassis coupled to the front chassis;
a top frame mounted to the front chassis and the rear chassis, the top frame comprising a plurality of mounting pads configured to interchangeably couple with at least two different payload structures, wherein the top frame is coupled to the front chassis via a first front mounting pin and a second front mounting pin;
a payload identification module configured to communicatively couple with a payload structure of the at least two different payload structures, the payload identification module to:
 detect an electrical coupling of the payload structure;
 identify a first payload structure type of the payload structure based on data communicated via the electrical coupling;
 store a mapping between each payload structure type of a set of payload structure types and a corresponding drive mode; and
 determine, using the mapping, a first drive mode corresponding to the first payload structure type of the payload structure, wherein the first drive mode indicates a set of drive parameters associated with operation of the drive unit when coupled to the first payload structure type, wherein the set of drive parameters comprises an indication of one or more restricted areas of motion of the drive unit when coupled to the first payload structure type.

6. The drive unit of claim 5, wherein the top frame comprises a communication interface to communicatively couple with the payload structure and the payload identification module.

7. The drive unit of claim 5, further comprising:
a first drive wheel on a first side of the drive unit; and
a second drive wheel arranged on a second side of the drive unit.

8. The drive unit of claim 7, wherein the front chassis comprises:
the first front mounting pin on the first side of the drive unit; and
the second front mounting pin on the second side of the drive unit.

9. The drive unit of claim 8, wherein the rear chassis comprises:
a first rear mounting pin on the first side of the drive unit; and
a second rear mounting pin on the second side of the drive unit.

10. The drive unit of claim 9, wherein the top frame is coupled to the rear chassis via the first rear mounting pin and the second rear mounting pin.

11. The drive unit of claim 10, wherein the first front mounting pin is spaced at a first pin distance from the first drive wheel; and wherein the first rear mounting pin is spaced at a second pin distance from the first drive wheel.

12. The drive unit of claim 11, wherein the second front mounting pin is spaced at a third pin distance from the second drive wheel; and wherein the second rear mounting pin is spaced at a fourth pin distance from the second drive wheel.

13. The drive unit of claim 12, wherein at least one of the first pin distance, the second pin distance, the third pin distance or the fourth pin distance is determined in view of an optimization of a slip acceleration and a lift acceleration of the drive unit.

14. A method comprising:
detecting, by a processing device of a drive unit, an electrical coupling of a first payload structure to the drive unit;
identifying, in view of data communicated via the electrical coupling with the first payload structure, a first payload structure type of the first payload structure;
storing a mapping between each payload structure type of a set of payload structure type and a corresponding drive mode;
determining, using the mapping, a first drive mode corresponding to the first payload structure type of the first payload structure, wherein the first drive mode indicates a set of drive parameters associated with operation of the drive unit when coupled to the first payload structure type, wherein the set of drive parameters comprises an indication of one or more restricted areas of motion of the drive unit when coupled to the first payload structure type; and
controlling an operation of the drive unit in accordance with the first drive mode.

15. The method of claim 14, wherein the set of drive parameters comprise at least one of a speed of the drive unit or an acceleration of the drive unit coupled to the first payload structure.

16. The method of claim 14, further comprising:
- detecting a disconnection of the electrical coupling of the first payload structure to the drive unit;
- detecting a second electrical coupling of a second payload structure to the drive unit; and
- identifying a second payload structure type of the second payload structure, wherein the first payload structure type and the second payload structure type are different.

17. The method of claim 16, further comprising:
- determining, based on the mapping, a second drive mode corresponding to the second payload structure type of the second payload structure, wherein the second drive mode indicates one or more drive parameters associated with operation of the drive unit coupled to the second payload structure.

\* \* \* \* \*